United States Patent
Winger et al.

(10) Patent No.: US 9,711,983 B2
(45) Date of Patent: Jul. 18, 2017

(54) DEVICE, SYSTEM AND METHOD FOR CHARGING A BATTERY

(71) Applicant: BLACKBERRY LIMITED, Waterloo (CA)

(72) Inventors: Lyall Kenneth Winger, Waterloo (CA); Ahmed Abdelsamie, Nepean (CA); Eric Schwartz, Waterloo (CA)

(73) Assignee: BLACKBERRY LIMITED, Waterloo, Ontario (CA)

(*) Notice: Subject to any disclaimer, the term of this patent is extended or adjusted under 35 U.S.C. 154(b) by 124 days.

(21) Appl. No.: 14/248,498

(22) Filed: Apr. 9, 2014

(65) Prior Publication Data

US 2015/0295441 A1 Oct. 15, 2015

(51) Int. Cl.
*H02J 7/00* (2006.01)
*G06F 13/40* (2006.01)
*G06F 1/26* (2006.01)

(52) U.S. Cl.
CPC .......... *H02J 7/0052* (2013.01); *G06F 1/266* (2013.01); *G06F 13/4081* (2013.01); *H02J 2007/0062* (2013.01); *H02J 2007/0096* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | | |
|---|---|---|---|
| 6,977,486 B2 | 12/2005 | Choi | |
| 2003/0115400 A1* | 6/2003 | Hoshino | G06F 13/4081 710/305 |
| 2004/0075418 A1 | 4/2004 | Densham et al. | |
| 2006/0267553 A1 | 11/2006 | Chuang et al. | |
| 2008/0265838 A1 | 10/2008 | Garg et al. | |
| 2009/0295339 A1 | 12/2009 | Wong | |
| 2010/0070659 A1* | 3/2010 | Ma | G06F 13/385 710/14 |
| 2010/0185877 A1* | 7/2010 | Chueh | G06F 1/3203 713/300 |
| 2011/0225441 A1* | 9/2011 | Chueh | G06F 1/28 713/340 |
| 2013/0198535 A1* | 8/2013 | Takashima | G06F 1/266 713/300 |

OTHER PUBLICATIONS

European Patent Application No. 15162006.9 dated May 29, 2015.

* cited by examiner

*Primary Examiner* — Kim Huynh
*Assistant Examiner* — Paul J Yen
(74) *Attorney, Agent, or Firm* — Perry + Currier, Inc.

(57) ABSTRACT

A device, system and method for charging a battery are provided. The device comprises: a USB (Universal Serial Bus) port; a battery in communication with the USB port; and, circuitry in communication with the USB port and the battery, the circuitry configured to: transmit a power control signal over the USB port, the power control signal comprising data indicative of one or more of a power, a voltage and a current to be received over the USB port to charge the battery; and, responsively receive the power for charging the battery over the USB port.

14 Claims, 6 Drawing Sheets

DEVICE, SYSTEM AND METHOD FOR CHARGING A BATTERY

FIELD

The specification relates generally to charging batteries, and specifically to a device, system and method for charging a battery.

BACKGROUND

The Universal Serial Bus (USB) has evolved from a data interface capable of supplying limited power to a primary provider of power with a data interface. Today many devices charge or get their power from USB ports contained in laptops, cars, aircraft or even wall sockets. USB has become a ubiquitous power socket for many small devices such as cell phones, MP3 players and other hand-held devices. The charger path of USB systems currently includes a buck regulator inside the charger and then again another series of switching regulators and/or buck regulators in a device being charged, to provide constant current and voltage for charging a battery, for example, a lithium battery. Each one of these regulators add inefficiencies to the charging path. The power lost from switching (e.g. stepping up or down to a charging current and/or voltage) becomes heat and hence a power management integrated circuit (PMIC) must be larger to compensate for heat dissipation. The combination of increased footprint and excess heat reduce overall performance.

While designs using two buck regulators (e.g. one in the charger and one in the device) can offer efficiencies of around 75%, they do not deliver optimal amounts of power to the battery to charge at maximal rates. A common strategy to combat this is to have VBUS output (of a USB port) at a higher voltage, at the same current output, which allows for higher power delivery to the system. However, this strategy creates a few challenges. For one, the system needs to have two buck regulators: a first one to make the inputs to system voltage regulators (e.g. LDOs (low dropout output regulators) and the like); and a second one to create a constant current constant voltage source for the battery. This also increased cost of the power path. Secondly, having to step down from an even higher voltage exasperates the heat dissipation problems.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

The present disclosure describes examples of a system comprising a charger and a device, where the device calculates a target power and/or target voltage and/or target current to be output by the charger to the device along a power path for charging a battery at the device. The device outputs a power control signal to the charger via a connection with charger, the connection including, but not limited to, one or more of a hardware port, data port, an interface, hardware interface, a USB port, and the like. The power control signal is encoded with one or more of the target power and/or the target voltage and/or the target current. The charger receives the power control signal, the charger comprising respective circuitry for responding to the power control signal by outputting one or more of a power, a current and/or a voltage according to the encoding in the power control signal. This eliminates need for a stepping regulator in the device, as the power control signal causes the charger to output the target power/current/voltage, rather than the stepping regulator regulating to same; hence, the overall efficiency of the power path is increased due to the elimination of the need for the stepping regulator of the device.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as connected physically, electronically, or any combination thereof, according to context. In general, components that are electrically connected are configured to communicate (that is, they are capable of communicating) by way of electric signals. According to context, two components that are physically coupled and/or physically connected may behave as a single element. In some cases, physically connected elements may be integrally formed, e.g., part of a single-piece article that may share structures and materials. In other cases, physically connected elements may comprise discrete components that may be fastened together in any fashion. Physical connections may also include a combination of discrete components fastened together, and components fashioned as a single piece.

In this specification reference is made to the term "port"; while the term "port" in the computer technical arts, can refer to a software port, it is explicitly appreciated that the term "port" as used in this specification refers to a hardware port, an interface, a hardware interface, a computer interface, and the like. Further the terms "hardware port", "interface" and/or "hardware interface" and/or "computer interface" can be interchangeably used throughout this specification in place of the term "port".

An aspect of the specification provides a device comprising: a USB (Universal Serial Bus) port; a battery in communication with the USB port; and, circuitry in communication with the USB port and the battery, the circuitry configured to: transmit a power control signal over the USB port, the power control signal comprising data indicative of one or more of a power, a voltage and a current to be received over the USB port to charge the battery; and, responsively receive the power for charging the battery over the USB port.

The power control signal can comprise a pulsed width modulation (PWM) signal transmitted over a USB Identification (USBID) connector of the USB port, and the power is responsibly received over a Voltage Bus (VBUS) connector of the USB port.

The power control signal can comprise an analog signal transmitted over a VBUS connector of the USB port, and the power is responsibly received over the VBUS connector.

The power control signal can comprise a digital signal transmitted over one or more of a USB D+ connector and a USB D− connector of the USB port, and the power is responsibly received over a VBUS connector of the USB port.

The power control signal can comprise one or more of a PWM signal, an analog signal and a digital signal transmitted over one or more of a USBID connector, a VBUS connector, a USB D+ connector, and a USB D− connector, of the USB port, and the power is responsibly received over the VBUS connector.

The circuitry can be configured to: determine a target current to be received at the USB port for charging the battery; and adjust the power control signal so that the target current is received at the USB port.

The circuitry can be configured to: determine a target voltage to be received at the USB port for charging the battery, and adjust the power control signal so that the target voltage is received at the USB port.

The circuitry can comprise a power management integrated circuit (PMIC) in line between the USB port and the battery, the PMIC configured to: determine one or more of a received voltage and a received current from the USB port; and the circuitry further configured to: adjust the power control signal based on one or more of the received voltage and the received current so that one or more of: the received current approaches a target current; and the received voltage approaches a target voltage.

Another aspect of the specification provides a method comprising: at a device comprising: a USB (Universal Serial Bus) port; a battery in communication with the USB port; and, circuitry in communication with the USB port and the battery, transmitting, using the circuitry, a power control signal over the USB port, the power control signal comprising data indicative of one or more of a power, a voltage and a current to be received over the USB port to charge the battery; and, responsively receiving, at the circuitry, the power for charging the battery over the USB port.

The power control signal can comprise a pulsed width modulation (PWM) signal transmitted over a USB Identification (USBID) connector of the USB port, and the power is responsibly received over a Voltage Bus (VBUS) connector of the USB port.

The power control signal can comprise an analog signal transmitted over a VBUS connector of the USB port, and the power is responsibly received over the VBUS connector.

The power control signal can comprise a digital signal transmitted over one or more of a USB D+ connector and a USB D− connector of the USB port, and the power is responsibly received over a VBUS connector of the USB port.

The power control signal can comprise one or more of a PWM signal, an analog signal and a digital signal transmitted over one or more of a USBID connector, a VBUS connector, a USB D+ connector, and a USB D− connector, of the USB port, and the power is responsibly received over the VBUS connector.

The method can further comprise: determining, at the circuitry, a target current to be received at the USB port for charging the battery; and adjusting the power control signal so that the target current is received at the USB port.

The method can further comprise: determining, at the circuitry, a target voltage to be received at the USB port for charging the battery; and adjusting, at the circuitry, the power control signal so that the target voltage is received at the USB port.

The circuitry can comprise a power management integrated circuit (PMIC) in line between the USB port and the battery, the PMIC configured to: determine one or more of a received voltage and a received current from the USB port; and the circuitry configured to: adjust the power control signal based on one or more of the received voltage and the received current so that one or more of: the received current approaches a target current; and the received voltage approaches a target voltage.

Yet a further aspect of the specification provides a computer program product, comprising a computer usable medium having a computer readable program code adapted to be executed to implement a method comprising: at a device comprising: a USB (Universal Serial Bus) port; a battery in communication with the USB port; and, circuitry in communication with the USB port and the battery, transmitting, using the circuitry, a power control signal over the USB port, the power control signal comprising data indicative of one or more of a power, a voltage and a current to be received over the USB port to charge the battery; and, responsively receiving, at the circuitry, the power for charging the battery over the USB port. The computer usable medium can comprise a non-transitory computer usable medium. The method can further comprise: determining, at the circuitry, a target current to be received at the USB port for charging the battery; and adjusting the power control signal so that the target current is received at the USB port. The method can further comprise: determining, at the circuitry, a target voltage to be received at the USB port for charging the battery; and adjusting, at the circuitry, the power control signal so that the target voltage is received at the USB port.

Yet a further aspect of the specification provides a system comprising: a charger comprising: a respective USB (Universal Serial Bus) port; and respective circuitry configured to receive a power control signal over the respective USB port; and, responsively transmit power over the respective USB port according to data in the power control signal; and, a device comprising: a USB port configured to communicate with the respective USB port of the charger; a battery in communication with the USB port; and, circuitry in communication with the USB port and the battery, the circuitry configured to: transmit the power control signal over the USB port to the charger, the data in the power control signal comprising data indicative of one or more of a power, a voltage and a current to be received over the USB port to charge the battery; and, responsively receive the power for charging the battery over the USB port.

Yet a further aspect of the specification provides a device comprising: a hardware port; a battery in communication with the hardware port; and, circuitry in communication with the hardware port and the battery, the circuitry configured to: transmit a power control signal over the hardware port, the power control signal comprising data indicative of one or more of a power, a voltage and a current to be received over the hardware port to charge the battery; and, responsively receive the power for charging the battery over the hardware port.

The power control signal can comprise a pulsed width modulation (PWM) signal transmitted over one or more of an identification connector and a data connector of the hardware port, and the power is responsibly received over a voltage connector of the hardware port.

The power control signal can comprise an analog signal transmitted over a voltage connector of the hardware port, and the power is responsibly received over the voltage connector.

The power control signal can comprise a digital signal transmitted over one or more data connectors of the hardware port, and the power is responsibly received over a voltage connector of the hardware port.

The power control signal can comprise one or more of a PWM signal, an analog signal and a digital signal transmitted over one or more of an identification connector, a voltage connector, and a data connector of the hardware port, and the power is responsibly received over the voltage connector.

The circuitry can be configured to: determine a target current to be received at the hardware port for charging the battery; and adjust the power control signal so that the target current is received at the hardware port.

The circuitry can be configured to: determine a target voltage to be received at the hardware port for charging the battery, and adjust the power control signal so that the target voltage is received at the hardware port.

The circuitry can comprise a power management integrated circuit (PMIC) in line between the hardware port and the battery, the PMIC configured to: determine one or more of a received voltage and a received current from the hardware port; and the circuitry further configured to: adjust the power control signal based on one or more of the received voltage and the received current so that one or more of: the received current approaches a target current; and the received voltage approaches a target voltage.

Another aspect of the specification provides a method comprising: at a device comprising: a hardware port; a battery in communication with the hardware port; and, circuitry in communication with the hardware port and the battery, transmitting, using the circuitry, a power control signal over the hardware port, the power control signal comprising data indicative of one or more of a power, a voltage and a current to be received over the hardware port to charge the battery; and, responsively receiving, at the circuitry, the power for charging the battery over the hardware port.

The power control signal can comprise a pulsed width modulation (PWM) signal transmitted over one or more of an identification connector and a data connector of the hardware port, and the power is responsibly received over a voltage connector of the hardware port.

The power control signal can comprise an analog signal transmitted over a voltage connector of the hardware port, and the power is responsibly received over the voltage connector.

The power control signal can comprise a digital signal transmitted over a data connector of the hardware port, and the power is responsibly received over a voltage connector of the hardware port.

The power control signal can comprise one or more of a PWM signal, an analog signal and a digital signal transmitted over one or more of an identification connector, a voltage connector, and a data connector, of the hardware port, and the power is responsibly received over the voltage connector.

The method can further comprise: determining, at the circuitry, a target current to be received at the hardware port for charging the battery; and adjusting the power control signal so that the target current is received at the hardware port.

The method can further comprise: determining, at the circuitry, a target voltage to be received at the hardware port for charging the battery; and adjusting, at the circuitry, the power control signal so that the target voltage is received at the hardware port.

The circuitry can comprise a power management integrated circuit (PMIC) in line between the hardware port and the battery, the PMIC configured to: determine one or more of a received voltage and a received current from the hardware port; and the circuitry configured to: adjust the power control signal based on one or more of the received voltage and the received current so that one or more of: the received current approaches a target current; and the received voltage approaches a target voltage.

Yet a further aspect of the specification provides a computer program product, comprising a computer usable medium having a computer readable program code adapted to be executed to implement a method comprising: at a device comprising: a hardware port; a battery in communication with the hardware port; and, circuitry in communication with the hardware port and the battery, transmitting, using the circuitry, a power control signal over the hardware port, the power control signal comprising data indicative of one or more of a power, a voltage and a current to be received over the hardware port to charge the battery; and, responsively receiving, at the circuitry, the power for charging the battery over the hardware port. The computer usable medium can comprise a non-transitory computer usable medium. The method can further comprise: determining, at the circuitry, a target current to be received at the hardware port for charging the battery; and adjusting the power control signal so that the target current is received at the hardware port. The method can further comprise: determining, at the circuitry, a target voltage to be received at the hardware port for charging the battery; and adjusting, at the circuitry, the power control signal so that the target voltage is received at the hardware port.

Yet a further aspect of the specification provides a system comprising: a charger comprising: a respective hardware port; and respective circuitry configured to receive a power control signal over the respective hardware port; and, responsively transmit power over the respective hardware port according to data in the power control signal; and, a device comprising: a hardware port configured to communicate with the respective hardware port of the charger; a battery in communication with the hardware port; and, circuitry in communication with the hardware port and the battery, the circuitry configured to: transmit the power control signal over the hardware port to the charger, the data in the power control signal comprising data indicative of one or more of a power, a voltage and a current to be received over the hardware port to charge the battery; and, responsively receive the power for charging the battery over the hardware port.

Figure 1:
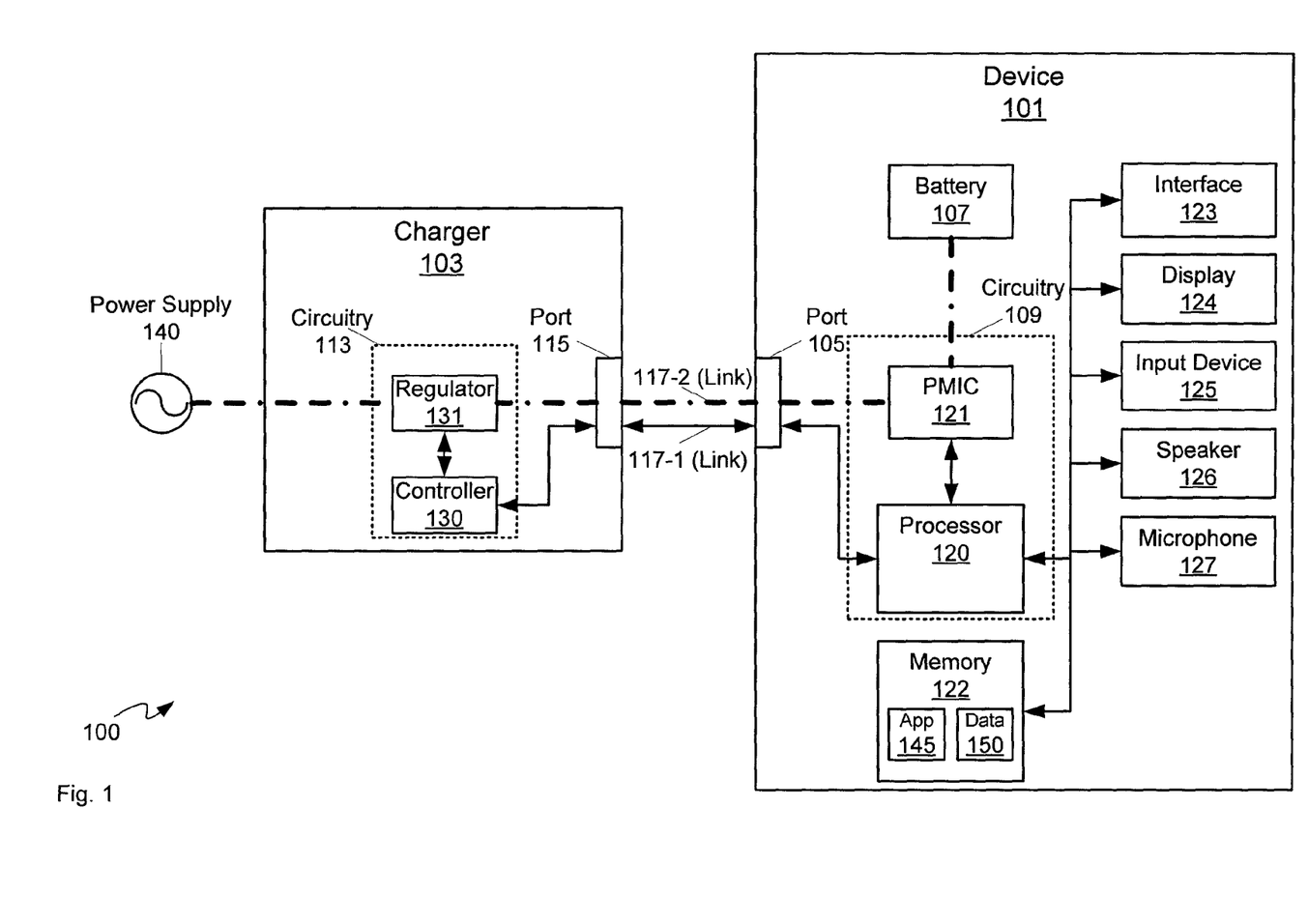
FIG. 1 depicts a schematic diagram of a system for charging a battery, according to non-limiting implementations.

FIG. 1 depicts a system 100 comprising a device 101 and a charger 103, according to non-limiting implementations. Device 101 comprises: a port 105; a battery 107 in communication with port 105; and, circuitry 109 in communication with port 105 and battery 107, circuitry 109 configured to: transmit a power control signal over port 105, the power control signal comprising data indicative of one or more of a power, a voltage and a current to be received over port 105 to charge battery 107; and, responsively receive the power for charging battery 107 over port 105. Charger 103 comprises: a respective port 115 (in communication with port 105 via one or more links 117-1, 117-2, for example); and respective circuitry 113 configured to receive the power control signal over respective port 115; and, responsively transmit power over respective port 115 according to the data in the power control signal.

Circuitry 109 can generally comprise: a processor 120 in communication with a power management integrated circuitry (PMIC) 121; in some implementations, processor 120 and PMIC 121 can be combined, while in other implementations, as depicted, processor 120 and PMIC 121 can be separate devices.

Device 101 further comprises: a memory 122, and optionally, a communication interface 123 (interchangeably referred to hereafter as interface 123), a display 124, an input device 125, a speaker 126 and a microphone 127.

Circuitry 113 generally comprises a controller 130 in communication with a power regulator 131 (interchangeably referred to hereafter as regulator 131); in some implementations, controller 130 and regulator 131 can be combined, while in other implementations, as depicted, controller 130 and regulator 131 can be separate devices.

Charger 103, and specifically regulator 131, can be further connected to an external power supply 140, for example, a mains power supply 140, and the like, outputting alternating current.

Each of circuitry 109, 113 are depicted in stippled lines surrounding respective components of each of device 101 and charger 103 including, but not limited to, respectively, processor 120 and PMIC 121, and controller 130 and regulator 131. Other components (not depicted) can be part of each of circuitry 109, 113, as described below. However, circuitry 109 is specifically lacking a regulator between PMIC 121 and battery 107.

Furthermore, in FIG. 1, data paths and/or data links are depicted as solid lines, while power paths and/or power links are depicted as broken lines (specifically, dash-dash-dot, for example link 117-2).

Ports 105, 115 are each configured to communicate with each other, for example, when linked via one or more links 117-1, 117-2, interchangeably referred to hereafter, collectively, as links 117 and generically as a link 117.

Each port 105, 115 can comprise one or more of a hardware port, data port, an interface, a hardware interface, a USB (universal serial bus) port and the like.

Furthermore, while specific implementations are described with respect to ports 105, 115 being USB ports, ports 105, 115 can include any suitable hardware port where a power control signal can be transmitted from port 105 to port 115 via a link there between, and power is responsibly received at port 105 from port 115 via a link there between. Such hardware ports can include, but are not limited to, ethernet ports, parallel ports, serial ports, IEEE 1394 ports, PS/2 ports, VGA (Video Graphics Array) ports, DVI (Digital Visual Interface) ports, SCSI (Small Computer System Interface) ports, HDMI (High-Definition Multimedia Interface) ports, and the like.

Furthermore, current implementations can be applied to any USB specification, including, but not limited to USB specifications 3.1, 3.0, 2.0, 1.0, including, but not limited to, USB specification 3.1 released on Jul. 26, 2013, as well as any future USB specifications, and/or updates to current USB specifications. Current implementations can further be applied to any USB specification that is not defined by "official" USB specifications, for example proprietary USB specifications and/or modified USB specifications (e.g. USB specifications which can be based on one or more of USB specifications 3.1, 3.0, 2.0, 1.0, and/or future "official" USB specifications, but do not strictly adhere to such) and/or variations of USB specifications.

Links 117 can comprise a suitable combination of cables and connectors to link ports 105, 115 to each other. For example, when each of ports 105, 115 comprise a USB port, links 117 can comprise a USB cable connected to each of ports 105, 115. Hence, links 117 can be removable from each of device 101 and charger 103, and/or links 117 can be removably connected to each of ports 105, 115.

While links 117 are depicted as separate in FIG. 1, links 117 can be combined in a single cable, either as separate lines in the single cable or the same line in the single cable.

In general, links 117 can convey data signals between device 101 and charger 103, including but not limited to power control signals, and further convey power from charger 103 to device 101 to charge battery 107. For example, as depicted, processor 120 can transmit a power control signal to controller 130 via link 117-1, and controller 130 can responsively control regulator 131 to provide power from power supply 140 to PMIC 121 via link 117-2, which in turn conveys the power to battery 107 to charge battery 107.

It should be emphasized that the structure of device 101 in FIG. 1 is purely an example, and contemplates a device that can be used for both wireless voice (e.g. telephony) and wireless data communications (e.g. email, web browsing, text, and the like). However, FIG. 1 contemplates a device that can be used for any suitable specialized functions, including, but not limited, to one or more of, telephony, computing, appliance, and/or entertainment related functions.

Device 101 comprises at least one input device 125 generally configured to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 125 is received at processor 120 (which can be implemented as a plurality of processors, including but not limited to one or more central processors (CPUs)). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art will now recognize that memory 122 is an example of computer readable media that can store programming instructions executable on processor 120. Furthermore, memory 122 is also an example of a memory unit and/or memory module.

Memory 122 further stores an application 145 that, when processed by processor 120, enables processor 120 to: transmit a power control signal over port 105, for example via link 117-1, the power control signal comprising data indicative of one or more of a power, a voltage and a current to be received over port 105 to charge battery 107 so that PMIC 121 can responsively receive the power for charging battery 107 over port 105, for example via link 117-2.

Furthermore, memory 122 storing application 145 is an example of a computer program product, comprising a non-transitory computer usable medium having a computer readable program code adapted to be executed to implement a method, for example a method stored in application 145.

Memory 122 can further store data 150 indicative of target charging conditions for battery 107, including, but not limited to, one or more of a target charge current, a target charge voltage, a target charge power, and the like. Data 150 can further (and optionally) comprise include a plurality of target charging conditions for battery 107; for example, in some implementations, circuitry 109 can include a fuel gauge (not depicted) configured to determine a degree of charging of battery 107 and/or a charge state of battery 107, and target charging conditions can change based on a degree to which battery 107 is charged and/or a charge state of battery 107, as measured by the fuel gauge (e.g. a target charging current can be different when the battery is drained than when the battery is 90% charged).

Data 150 can further (and optionally) comprise target charging conditions for a plurality of batteries; for example, each battery and/or battery type that can be inserted into device 101 can have different charging specifications; hence, if battery 107 is of a given type, and is replaced by another battery of a different type (e.g. of battery 107 and a replacement battery have different product numbers and/or are based on different technologies and/or different materials and/or different chemicals), the target charge current can change. Hence data 150 can comprise target charging conditions and/or a plurality of target conditions for a plurality of batteries and/or battery types.

PMIC 121 generally comprises integrated circuits, and the like, for managing power requirements of device 101. In general, PMIC 121 can comprise switches, FETs (field-effect transistors) and the like for controlling power to charge battery 107; PMIC 121 can further comprise one or more LDOs (low drop-out regulator).

PMIC 121 can optionally be configured to determine one or more of an input voltage, an output voltage and a current passing there through, and communicate one or more of the input voltage, the output voltage and the current passing there through to processor 120. Hence, PMIC 121 can optionally comprise one or more sensors for sensing one or more of: current passing there through, an input voltage, an output voltage, a voltage across PMIC 121, and the like.

Hence, PMIC 121 can determine a charging current passing there through and/or a voltage drop there across (e.g. input voltage minus output voltage) and convey data indicating such to processor 120; processor 120 can compare the charging current and/or voltage drop at PMIC 121 and compare to target charging conditions for battery 107 as stored in data 150. Processor 120 can transmit a power control signal to charger 103 via ports 105, 115 and link 117-1 to adjust the charging conditions when existing charging conditions are different from the target charging conditions.

In other words, when device 101 is connected to charger 103 via ports 105, 115 and links 117, device 101 can initially transmit a power control signal to charger 103 via ports 105, 115, and link 117-1, the power control signal comprising target charging conditions as stored in data 150, thereby causing charger 103 to convey power to PMIC 121 via ports 105, 115 and link 117-2; ideally, charger 103 delivers power to PMIC 121 according to the target charging conditions, and PMIC 121 conveys the power to battery 107 to charge battery 107. However, PMIC 121 can optionally monitor the actual charging conditions (i.e. input voltage, output voltage and/or charging current passing there through) and convey same to processor 120, which can adjust the charging conditions by transmitting one or more further charging conditions to charger 103. As such device 101 and charger 103 form a feedback loop for charging battery 107, in order to attain the target charging conditions stored in data 150.

In some implementations, memory 122 and/or PMIC 121 and/or application 145 and/or data 150 can further store electrical characteristics of PMIC 121, including, but not limited to, a resistance of PMIC 121 so that processor 120 can convert a voltage across PMIC 121 to a current passing there through and/or convert a current passing there through to a voltage there across using, for example, Ohm's Law.

Processor 120 can be further configured to communicate with display 124, and speaker 126, and microphone 127. Display 124 comprises any suitable one of, or combination of, flat panel displays (e.g. LCD (liquid crystal display), plasma displays, OLED (organic light emitting diode) displays, capacitive or resistive touchscreens, CRTs (cathode ray tubes) and the like). Speaker 126 comprises any suitable speaker for converting audio data to sound to provide one or more of audible alerts, audible communications from remote communication devices, and the like. Microphone 127 comprises any suitable microphone for receiving sound and converting to audio data. In some implementations, input device 125 and display 124 are external to device 101, with processor 120 in communication with each of input device 125 and display 124 via a suitable connection and/or link.

Processor 120 also connects to interface 123, which can be implemented as one or more radios and/or connectors and/or network adaptors and/or transceivers, configured to wirelessly communicate with one or more communication networks (not depicted), for example via antennas (not depicted). It will be appreciated that interface 123 is configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, Bluetooth™ links, NFC (near field communication) links, WLAN (wireless local area network) links, WiFi links, WiMax links, packet based links, the Internet, analog networks, the PSTN (public switched telephone network), access points, and the like, and/or a combination. Specifically, interface 123 comprises radio equipment (i.e. a radio transmitter and/or radio receiver) for receiving and transmitting signals, for example using antennas (not depicted).

Battery 107 comprises a rechargeable battery, including, but not limited to, a lithium battery, a nickel-cadmium battery, and the like. In some implementations, battery 107 can be replaceable (e.g. device 101 can comprise a battery holder accessible by a user), while, in other implementations, battery 107 is not replaceable.

While not depicted, device 101 generally comprises one or more of a chassis and a housing for housing and/or supporting and/or containing components of device 101 and/or to further provide structural integrity to device 101. The chassis and/or housing can include, but is not limited to, an outer housing, an internal frame and the like. The chassis and/or housing can further comprise apertures for accessing components of device 101, for example an aperture to view display 124 and an aperture for accessing port 105.

In any event, it should be understood that a wide variety of configurations for device 101 are contemplated.

Charger 103 can comprise a battery charger and the like for charging battery 107 at device 101 and batteries at other devices. Controller 130 can comprise one or more of a processor, a microcontroller and the like configured to: communicate with circuitry 109 and/or processor 120 to receive a power control signal there from; and control regulator 131 to provide power to one or more of circuitry 109, PMIC 121 and battery 107 to charge battery 107, according to charging conditions received in the power control signal at controller 130. Regulator 131 comprises one or more of a variable regulator, a variable output regulator, a buck regulator, a switching regulator, and the like for receiving input power from power supply 140 and converting the input power from power supply 140 to output power to one or more of circuitry 109, PMIC 121 and battery 107 to charge battery 107. In general, output power of regulator 131 is variable based on signals from controller 130, which in turn are based on a power control signal from device 101. Furthermore, charger 103, circuitry 113, and/or regulator 131 can comprise an AC (alternating current) to DC (direct current) converter in the event that charging is to occur using direct current rather than alternating current as output by power supply 140.

While not depicted, charger 103 can further comprise a memory, for example at controller 130 storing an application that, when processed by controller 130, causes circuitry 113 to be configured to: receive a power control signal over port 115 (e.g. at controller 130); and, responsively transmit power over port 115 according to data in the power control signal (e.g. controller 130 controls regulator 131 to vary and/or change power output from regulator 131 according to the power control signal). Furthermore, a memory at charger 103 storing such an application is an example of a computer program product, comprising a non-transitory computer usable medium having a computer readable program code adapted to be executed to implement a method, for example a method stored in the application at charger 103.

Figure 2:
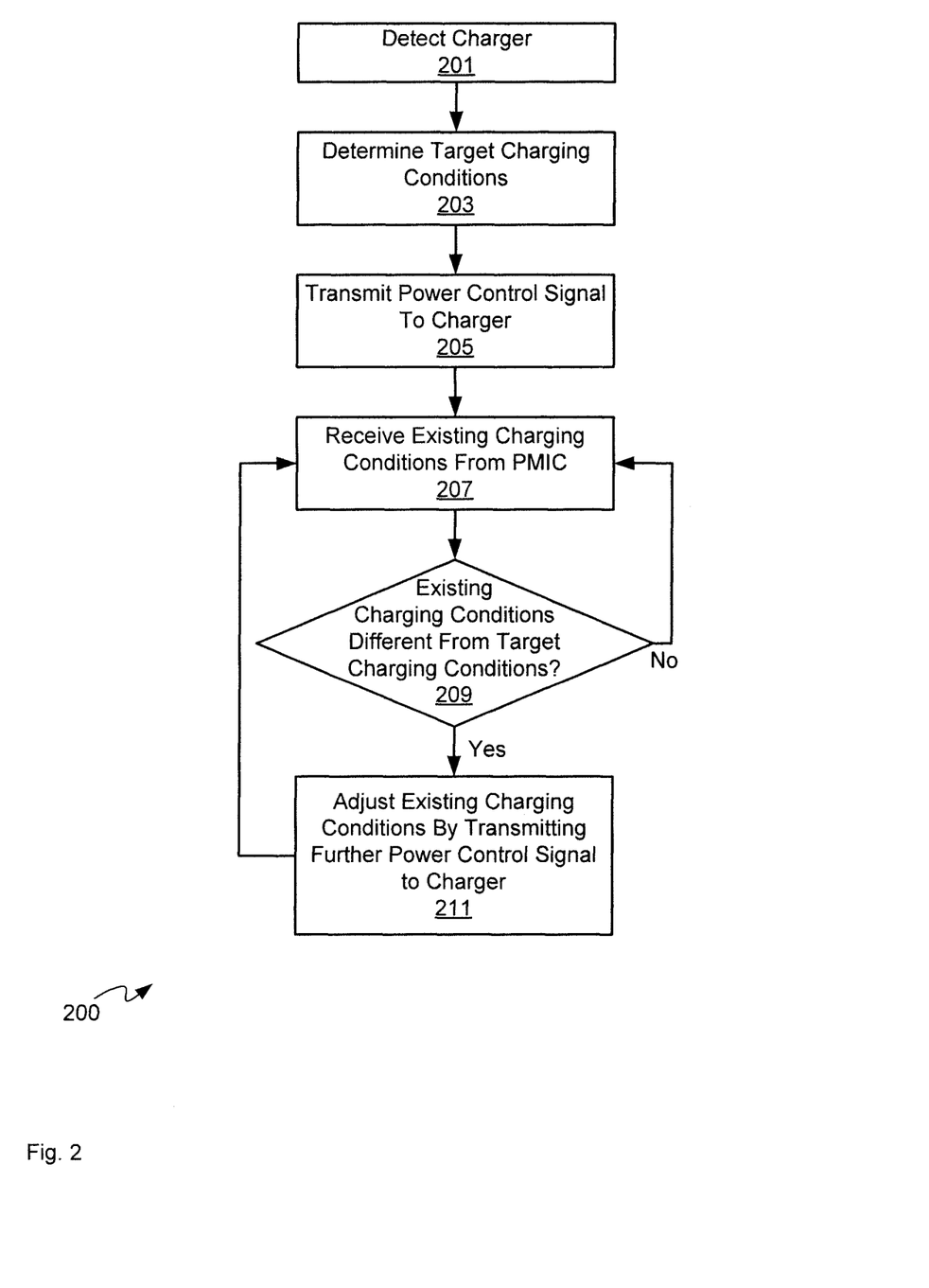
FIG. 2 depicts a block diagram of a flowchart of a method for charging a battery, according to non-limiting implementations.

Attention is next directed to FIG. 2 which depicts a flowchart illustrating a method 200 of charging a battery, according to non-limiting implementations. In order to assist in the explanation of method 200, it will be assumed that method 200 is performed using system 100. Furthermore, the following discussion of method 200 will lead to a further understanding of system 100 and its various components. However, it is to be understood that system 100 and/or method 200 can be varied, and need not work exactly as discussed herein in conjunction with each other, and that such variations are within the scope of present implementations. It is appreciated that, in some implementations, method 200 is implemented in system 100 by processor 120 of device 101, for example by implementing application 145.

It is to be emphasized, however, that method 200 need not be performed in the exact sequence as shown, unless otherwise indicated; and likewise various blocks may be performed in parallel rather than in sequence; hence the elements of method 200 are referred to herein as "blocks" rather than "steps". It is also to be understood that method 200 can be implemented on variations of system 100 as well.

At block 201, processor 120 detects charger 103; for example, when charger 103 is connected to device 101 via ports 105, 115 and links 117, processor 120 and controller 130 can exchange handshake signals and the like, the handshake signals indicating to each of processor 120 and charger 103 the presence of the other of processor 120 and charger 103.

At block 203, processor 120 determines target charging conditions, for example by processing data 150; in some implementations, at block 203, processor 120 can further and optionally determine a battery type of battery 107; for example in some implementations battery 107 comprises a memory (not depicted), and the like, storing an identifier thereof, and processor 120 can be configured to retrieve the identifier from the memory of battery 107, and in turn retrieve the charging conditions from data 150. Either way, processor 120 can retrieve target charging conditions from data 150 at memory 122.

In yet a further alternative, at block 203, processor 120 can determine an existing degree of charging and/or a charge state of battery 107, for example via the above described optional fuel gauge, and retrieve charging conditions from data 150 based thereupon.

At block 205, processor 120 transmits a power control signal to charger 103, via ports 105, 115, and link 117-1, the power control signal comprising target charging conditions for charging battery 107. Controller 130 receives the target charging conditions and controls regulator 131 to output power to port 115 according to the target charging conditions, for example a target charging current, target charging voltage, and/or target charging power. The power is received at port 105, and hence at PMIC 121 and battery 107 to charge battery 107.

In some implementations, method 200 can end at block 205 and/or when battery 107 is charged and/or when charger 103 and/or link 117 is disconnected from device 101. However, in other implementations, a feedback loop can occur between device 101 and charger 103 as described hereafter with respect to blocks 207 to 211.

At block 207, processor 120 receives the existing charging conditions from PMIC 121, including, but not limited to, the existing charging current and/or a voltage across PMIC 121 which can alternatively be converted to charging current using the resistance of PMIC 121 and Ohm's Law.

At block 209, processor 120 can compare the existing charging conditions to the target charging conditions; in some of these implementations, the target charging conditions can change based on a degree of charging and/or a charge state of battery 107 as measured by the optional fuel gauge, described above. Either way, when the existing charging conditions are different from the target charging conditions (e.g. a "Yes" decision at block 209), at block 211, processor 120 can adjust the existing charging conditions by transmitting a further power control signal to charger 103. Processor 120 continues to monitor the existing charging conditions at block 207. However, when the existing charging conditions are not different from the target charging conditions (e.g. a "No" decision at block 209), processor 120 continues to monitor the existing charging conditions at block 207. In general, blocks 207 to 211 repeat in a feedback loop so that the existing charging conditions converge on the target charging conditions (e.g. a target charging current through PMIC 121 and/or to battery 107, and/or a target voltage across PMIC 121, based on a target charging current and Ohm's Law).

In the feedback loop, in a specific non-limiting example, circuitry 109 is generally configured to: determine a target current to be received over port 105 for charging battery 107, and adjust power control signal 411 so that the target current is received over port 105. Alternatively, circuitry 109 can be generally configured to: determine a target voltage to be received over port 105 for charging battery 107, and adjust power control signal 411 so that the target voltage is received over port 105. Power control signal 411 can comprise one or more absolute target charging conditions and/or an amount of current and/or voltage and/or power by which output of charger 103 is to be changed (i.e. an increase or a decrease in current and/or voltage and/or power).

As described above circuitry 109 comprises PMIC 121 in line between port 105 and battery 107, PMIC 121 configured to: determine one or more of a received voltage and a received current from port 105; and circuitry 109 (e.g. processor 120) further configured to: adjust power control signal 411 based on one or more of the received voltage and the received current so that one or more of: the received current approaches a target current; and the received voltage approaches a target voltage.

It is appreciated that the existing charging conditions being the same and/or different from the target charging conditions need not comprise an exact match and/or exact mismatch; in other words, the existing charging conditions can be considered the same as the target charging conditions as long as the existing charging conditions are within a given percentage of the target charging conditions, for example, within 5%, 10% and/or any percentage as chosen by an administrator and/or a designer of system 100.

Method 200 will now be described with reference to FIGS. 3 to 4, each of which are similar to FIG. 1, with like elements having like numbers.

Figure 3:
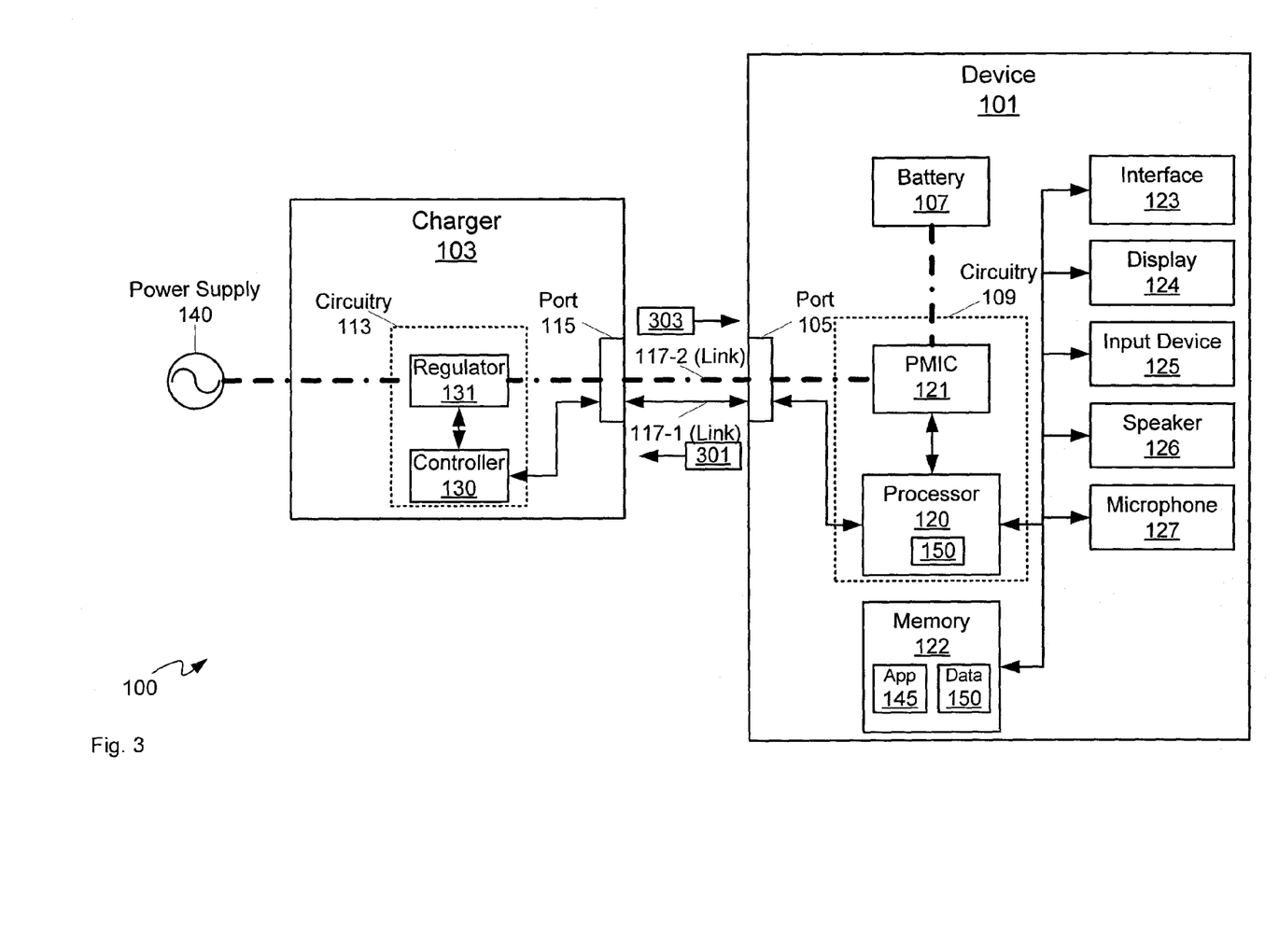
FIG. 3 depicts a device of the system of FIG. 1 transmitting a power control signal to a charger, and the charger delivering power to the device in accordance with the power control signal, according to non-limiting implementations.

At FIG. 3, processor 120 has detected charger 103 (e.g. via handshaking) and transmits a power control signal 301 to charger 103 via ports 105, 115 and link 117-1 based on data 150, data 150 processed by processor 120. Controller 130 processes power control signal 301 to determine target charging conditions and controls charger 103 to provide power 303 via ports 105, 115 and link 117-2, power 303 comprising voltage and/or current and/or power according to the target charging conditions in power control signal 301. In other words, FIG. 3 depicts blocks 201, 203 and 205 of method 200.

Figure 4:
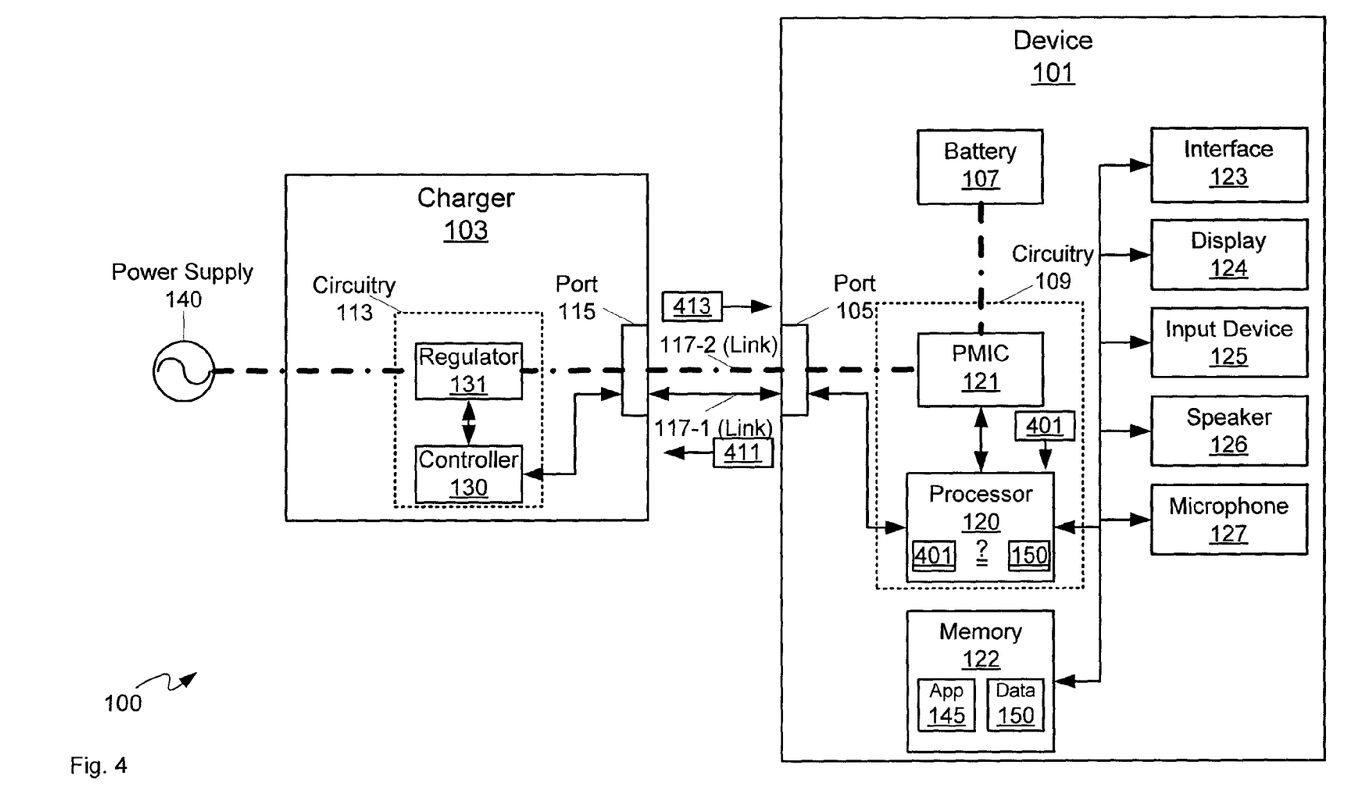
FIG. 4 depicts the device of the system of FIG. 1 further regulating power from the charger in a feedback loop therebetween, according to non-limiting implementations.

At FIG. 4, processor 120 receives existing charging conditions 401 from PMIC 121 and compares to the target charging conditions as stored in data 150. When existing charging conditions 401 are different from target charging conditions (for example, when voltage and/or current from regulator 131 drifts and/or controller 130 incorrectly processed target power signal 301), processor 120 transmits a further power control signal 411 to charger 103, further power control signal 411 comprising data for adjusting power 303 towards the target charging conditions; for example, controller 130 responsively adjusts regulator 131 to provide adjusted power 413, power 413 adjusted closer towards the target charging conditions. In other words, FIG. 4 depicts blocks 207, 209 and 211 of method 200.

Power control signals 301, 411 can comprise one or more of a pulsed width modulation (PWM) signal, an analog signal, a digital signal and the like. For example, attention is directed to FIG. 5 which depicts a specific non-limiting example of circuitry 109 and port 105, when port 105 comprises a USB port and a power control signal comprises a PWM signal. In these implementations, port 105 comprises five USB connectors: a VBus (voltage bus) connector for receiving power from charger 103; a USBID (USB identifier) connector generally used for conveying USB identifier signals between devices; a D+ connector and a D– connector for conveying data signals between devices, and a ground connector, labelled GND in FIG. 5.

Figure 5:
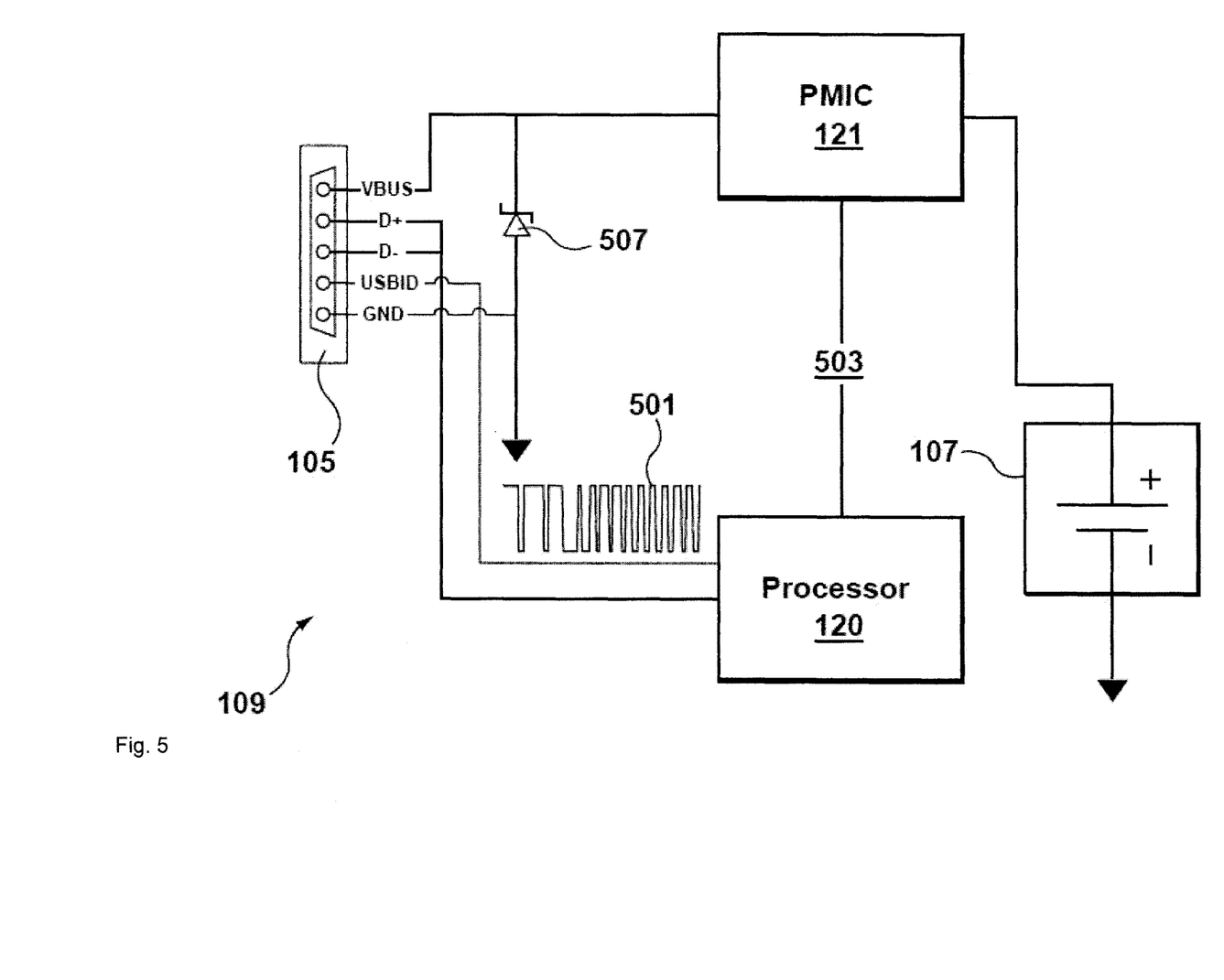
FIG. 5 depicts circuitry of the device of FIG. 1, according to non-limiting implementations.

In any event, in depicted implementations processor 120 transmits a power control signal 501 over USBID connector, power control signal 501 comprising a PWM signal comprising, in a non-limiting example, a frequency that is 1000 times a target charging voltage to be output to PMIC 121 by charger 103 over the VBus connector. Power control signal 501 can comprise one or more of power control signals 301, 411.

FIG. 5 also depicts processor 120 being alternatively connected to both the D+ connector and D– connector, a wired link 503 between PMIC 121 and processor 120 for conveying existing operating conditions to processor 120. A zener diode 507 between VBus connector and ground is also shown. While not depicted PMIC 121 can further comprise circuits for sending voltage and/or current at PMIC 121 and/or one or more switches and/or FETs for controlling power to battery 107.

While circuitry 109 can comprise further components, and/or different components, circuitry 109 is specifically lacking a regulator and/or a buck regulator between PMIC 121 and battery 107, which increases the efficiency of circuitry 109 as compared to similar devices that include a regulator between a PMIC and a battery.

Figure 6:
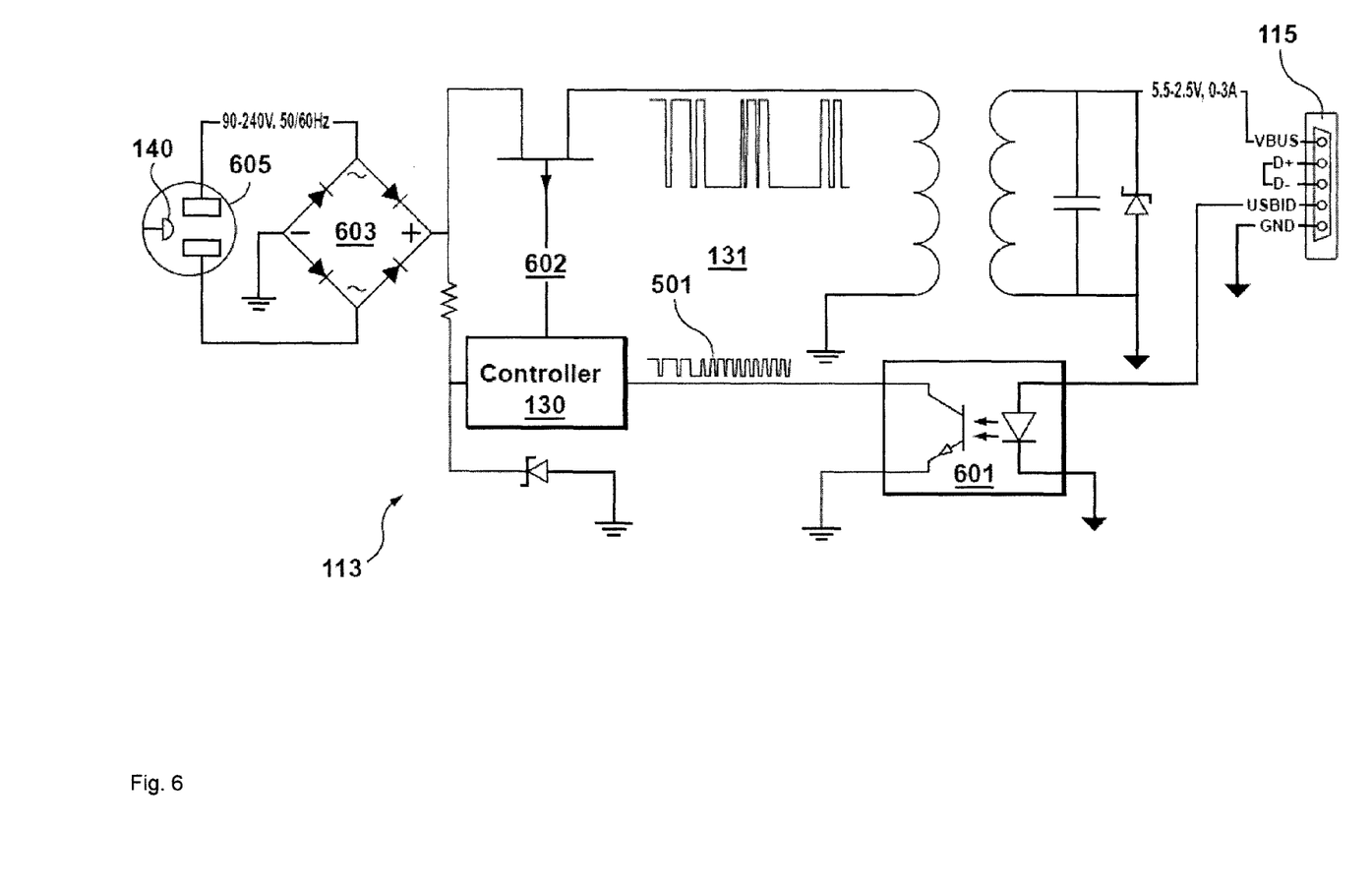
FIG. 6 depicts circuitry of the charger of FIG. 1, according to non-limiting implementations.

Attention is next directed to FIG. 6, which depicts circuitry 113 at charger 103 which is compatible with circuitry 109 as depicted in FIG. 5, and when port 115 also comprises a USB port and the power control signal comprises a PWM signal. In these implementations, port 115 comprises five USB connectors: a VBus connector for providing power to device 101; a USBID (USB identifier) connector generally used for conveying USB identifier signals between devices; a D+ connector and a D– connector for conveying data signals between devices, and a ground connector, labelled GND in FIG. 6. In other words, port 115 in FIG. 6 is substantially similar to port 105 in FIG. 5; when ports 105, 115 are connected, for example using a USB cable and connectors, each connector at each port 105, 115 is connected to a corresponding connector at the other port 105, 115. For example, each VBus connector is connected to each other, each D+ connector is connected to each other, each D– connector is connected to each other, each USBID connector is connected to each other and each GND connector is connected to each other.

Hence, in FIG. 6, controller 130 is connected to USBID connector of port 115 so that power control signal 501, comprising the PWM signal, from USBID connector of port 115 is received from processor 120 at device 101, when device 101 and charger 103 are connected. Controller 130 is connected to USBID connector via an optional sub-circuit 601 configured to modulate power control signal 501 for controller 130; in other implementations, sub-circuit 601 is absent from circuitry 109 and/or integrated into controller 130. Regardless, controller 130 is configured to receive power control signal 501 and control regulator 131 accordingly to output power to device 101. For example, when power control signal 501 comprises a signal that is a frequency that is 1000 times a target charging voltage to be output to PMIC 121 by charger 103, controller 130 processes power control signal 501 to determine the target output voltage (e.g. controller 130 determines a frequency of power control signal 501 and divides by 1000) and controls regulator 131 to the target output voltage.

Further, regulator 131 is connected to the VBus of port 115, so that power from regulator 131 is delivered to VBus of port 105, and hence to PMIC 121 and battery 107, when device 101 and charger 103 are connected. Furthermore, controller 130 and regulator 131 are connected via a link 602, so that controller 130 can control regulator 131 based on power control signal 501.

Also depicted are: an AC to DC converter 603 which can be part of regulator 131 and/or a separate component of charger 103; and a connector 605 to power supply 140. Also depicted in FIG. 6 are specific input and output ranges of voltages and currents for circuitry 113; however such ranges are provided as examples only and other ranges are within the scope of the present specification. For example a maximum output of circuitry 113 as depicted in FIG. 6 is shown as about 3 Amps and about 5.5 V; however, in other implementations, circuitry 113 can output more than 3 Amps and more than 5.5 V. Further, a minimum output voltage is depicted as 2.5 V; however, in other implementations circuitry 113 can output less than 2.5 V.

While specific components of device 101 and charger 103 are depicted in FIGS. 5 and 6, in other implementations, each of device 101 and charger 103 can include other components and/or different components, as long as device 101 and charger 103 are compatible with one another. For example, while in described implementations, power control signal 501 comprises a PWM signal that is a frequency that is 1000 times a target output voltage, in other implementations, power control signal 501 can comprise a PWM signal that has a target output current encoded therein, and controller 130 both processes power control signal 501 and controls regulator 131, accordingly.

Furthermore, while in depicted implementations in FIGS. 5 and 6, power control signal 501 comprises a PWM signal transmitted over a USBID connector of USB port 105 of FIG. 5, and power is responsibly received over VBUS connector of USB port 105 of FIG. 5, in other implementations, a power control signal can be transmitted over other connectors of a USB port and be a signal other than a PWM signal.

For example, a power control signal can comprise an analog signal transmitted over a VBUS connector of a USB port, and power can be responsibly received over the VBUS connector, i.e. the same VBUS connector. Hence, in these implementations, circuitry 109, 113 are adapted to such a scheme so that an analog signal is encoded for transmission over a same connector over which power is received.

Alternatively, a power control signal can comprise a digital signal transmitted over one or more of a USB D+ connector and a USB D− connector of a USB port, and power is responsibly received over a VBUS connector of the USB port. Hence, in these implementations, circuitry 109, 113 are adapted to such a scheme so that a digital signal is encoded for transmission over one or more of a USB D+ connector and a USB D− connector of a USB port, and power is provided over a VBUS connector.

Hence, the power control signal can comprise one or more of a PWM signal, an analog signal and a digital signal transmitted over one or more of a USBID connector, a VBUS connector, a USB D+ connector, and a USB D− connector, of the USB port, and the power is responsibly received over the VBUS connector.

Alternatively, as described above, ports 105,115 can be different from USB ports; indeed, while present implementations are described with regard to USB ports, each of ports 105, 115 can comprise any suitable port where a power control signal is transmitted from port 105 to port 115 and power is responsively received at port 105 from port 115, so that device 101 controls charger 103 to deliver the power according to the power control signal.

Efficiency of present implementations as compared to devices that include a regulator at device 101 can be understood as follows. For the following comparison, it is assumed that a battery at a device has a charging current of 3 Amps, and that the voltage at the battery is about 4.2 Volts, meaning about 12.6 Watts are to be delivered to the battery (based on power being equal to voltage times current). Assuming that, in a system of a charger and a device, each includes a respective regulator in a power path to a battery (i.e. two regulators) and each regulator is about 88% efficient (i.e. a common efficiency of a buck regulator), the total efficiency of such a system is about 77% (i.e. 88% times 88%); hence to achieve 12.6 Watts charging power at the battery, about 16.4 Watts should be received at charger 103 (i.e. 12.6 divided by 0.77) and/or the power delivered by the charger to the device should be about 14.3 Watts (i.e. 12.6 divided by 0.88, the efficiency of the regulator at the device). The power dissipation is largely in the form of heat.

In present systems that include one regulator at charger 103 of about 88% efficiency and PMIC 121 having a resistance of about 100 mOhms, and charging at about 3 Amps charging current, the power dissipation at the PMIC will be about 0.9 Watts (i.e. power being current squared times resistance), the power dissipation being largely in the form of heat. Hence, the total power delivered to the device by the charger should be about 13.5 Watts, or about 0.8 Watts less than the system with two regulators. Hence, the current system is about 6% more efficient than the system with two regulators (e.g. 0.8/13.5×100%).

Such a change in efficiency can further result in a reduction of heat dissipated at device 101, as compared to a device that includes a regulator, as less power is dissipated at device 101 as compared to the device that includes a regulator. In other words, there is about 0.8 Watts less heat dissipation in the present system as compared to the above described system with two regulators. Hence, heat dissipation at PMIC 121 can be relatively reduced, and a footprint of PMIC 121 can also be relatively reduced and/or heat dissipation devices (such as heat fins) can be eliminated and/or reduced.

Furthermore, as charger 103 includes controller 130 that can control regulator 131 to provide one or more of variable power output, variable voltage output and/or a variable current output, charger 103 becomes more versatile, as compared to chargers without a controller and variable regulator. For example, charging time of battery 107 at device 101 can be reduced by using higher charging powers and/or higher charging voltages and/or higher charging currents than would be provided a charger with a fixed output; such higher charging powers and/or higher charging voltages and/or higher charging currents can be stored in data 150 and used when faster charging is desired. In some implementations, device 101 can further comprise an application layer (e.g. a software layer) to control charger 103 according to user preferences, for example, to control the charging time.

In yet further implementations, charger 103 can be used as a plurality of devices configured to provide a power control signal to charger 103 as described above, each of the plurality of devices having different target charging conditions.

Hence, provided herein is a system including a device and a charger, the device controlling the charger to charge a battery of the device according to target charging conditions, which obviates a need for a regulator at the device. Such a charger is versatile and can be used with a plurality of battery types and/or a plurality of devices, as the charging output is variable and can be controlled automatically by the device being charged based on data stored therein and/or by a user of the device. Present implementations can be applied to USB based chargers including, but not limited to, present USB specifications, future USB specifications, and modifications thereto.

Those skilled in the art will appreciate that in some implementations, the functionality of device 101 and charger 103 can be implemented using pre-programmed hardware or firmware elements (e.g., application specific integrated circuits (ASICs), electrically erasable programmable read-only memories (EEPROMs), etc.), or other related components. In other implementations, the functionality of device 101 and charger 103 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever. Persons skilled in the art will appreciate that there are yet more alternative implementations and modifications possible, and that the above examples are only illustrations of one or more implementations. The scope, therefore, is to be limited by the claims appended here.

What is claimed is:

1. A device configured for charging by a charger, the charger comprising a controller and a respective regulator configured to convert power from an AC (alternating current) power supply to a DC (direct current) charging power, the charger being separate from the device, the device comprising:
a USB (Universal Serial Bus) port comprising a USB Identification (USBID) connector and a Voltage Bus (VBUS) connector;
a battery; and,
circuitry comprising:
a power management integrated circuit (PMIC) in-line between the USB port and the battery, the PMIC connected to the VBUS connector and the battery,
a processor in communication with the USBID connector, and
a wired link between the PMIC and the processor, the wired link for conveying existing charging conditions to the processor, the existing charging conditions comprising one or more of a charging current passing through the PMIC to the battery and a voltage drop across the PMIC, the circuitry lacking a regulator between the PMIC and the battery,
the processor configured to:
when the existing charging conditions are different from target charging conditions, transmit a power control signal over the USBID connector to the controller of the charger, the power control signal comprising the target charging conditions for controlling the respective regulator at the charger to output the DC charging power over the VBUS connector to the PMIC, according to the target charging conditions, the target charging conditions indicative of one or more of a target charging voltage and a target charging current to be received over the VBUS connector at the PMIC to charge the battery; and,
the PMIC configured to responsively receive the DC charging power over the VBUS connector from the charger according to the target charging conditions and convey the DC charging power to the battery for charging the battery,
wherein regulating of the DC charging power occurs only by the regulator of the charger, according to the target charging conditions, and not in the circuitry of the device.

2. The device of claim 1, wherein the power control signal further comprises one or more of a PWM signal and a digital signal.

3. The device of claim 1, wherein the processor is configured to: determine the target charging current to be received over the VBUS connector for charging the battery; and adjust the power control signal so that the target current is received at the VBUS connector.

4. The device of claim 1, wherein the processor is configured to: determine the target charging voltage to be received over the VBUS connector for charging the battery, and adjust the power control signal so that the target voltage is received at the VBUS connector.

5. The device of claim 1, wherein the PMIC is configured to: determine one or more of a received voltage and a received current from VBUS connector and provide the one or more of the received voltage and the received current to the processor over the wired link; and the processor further configured to: adjust the power control signal based on one or more of the received voltage and the received current so that one or more of: the received current approaches the target charging current; and the received voltage approaches the target charging voltage.

6. A method for charging a device using a charger, the charger comprising a controller and a respective regulator configured to convert power from an AC (alternating current) power supply to a DC (direct current) charging power, the charger being separate from the device, the method comprising:
at the device comprising: a USB (Universal Serial Bus) port comprising a USB Identification (USBID) connector and a Voltage Bus (VBUS) connector; a power management integrated circuit (PMIC) in-line between the USB port and the battery, the PMIC connected to the VBUS connector and the battery, a processor in communication with the USBID connector, and a wired link between the PMIC and the processor, the wired link for conveying existing charging conditions to the processor, the existing charging conditions comprising one or more of a charging current passing through the PMIC to the battery and a voltage drop across the PMIC, the circuitry lacking a regulator between the PMIC and the battery, when the existing charging conditions are different from target charging conditions, transmitting, using the processor, a power control signal over the USBID connector to the controller of the charger, the power control signal comprising the target charging conditions for controlling the respective regulator at the charger to output the DC charging power over the VBUS connector to the PMIC, according to the target charging conditions, the target charging conditions indicative of one or more of a target charging voltage and a target charging current to be received over the VBUS connector at the PMIC to charge the battery; and, responsively receiving, at the PMIC, the DC charging power over the VBUS connector from the charger according to the target charging conditions and convey the DC charging power to the battery for charging the battery, wherein regulating of the DC charging power occurs only by the regulator of the charger, according to the target charging conditions, and not in the circuitry of the device.

7. The device of claim 1, wherein the power control signal further comprises one or more of a PWM signal and a digital signal.

8. The method of claim 6, further comprising: determining, at the processor, the target charging current to be received over the VBUS connector for charging the battery; and adjust the power control signal so that the target current is received at the VBUS connector.

9. The method of claim 6, further comprising: determining, at the processor, the target charging voltage to be received over the VBUS connector for charging the battery, and adjust the power control signal so that the target voltage is received at the VBUS connector.

10. The method of claim 6, wherein the PMIC is configured to: determine one or more of a received voltage and a received current from VBUS connector and provide the one or more of the received voltage and the received current to the processor over the wired link; and the processor further configured to: adjust the power control signal based on one or more of the received voltage and the received current so that one or more of: the received current approaches the target charging current; and the received voltage approaches the target charging voltage.

11. A non-transitory computer-readable medium storing a computer program for charging a device using a charger, the charger comprising a controller and a respective regulator configured to convert power from an AC (alternating current) power supply to a DC (direct current) charging power, the charger being separate from the device, wherein execution of the computer program is for:

at the device comprising: a USB (Universal Serial Bus) port comprising a USB Identification (USBID) connector and a Voltage Bus (VBUS) connector; a power management integrated circuit (PMIC) in-line between the USB port and the battery, the PMIC connected to the VBUS connector and the battery, a processor in communication with the USBID connector, and a wired link between the PMIC and the processor, the wired link for conveying existing charging conditions to the processor, the existing charging conditions comprising one or more of a charging current passing through the PMIC to the battery and a voltage drop across the PMIC, the circuitry lacking a regulator between the PMIC and the battery, when the existing charging conditions are different from target charging conditions, transmitting, using the processor, a power control signal over the USBID connector to the controller of the charger, the power control signal comprising the target charging conditions for controlling the respective regulator at the charger to output the DC charging power over the VBUS connector to the PMIC, according to the target charging conditions, the target charging conditions indicative of one or more of a target charging voltage and a target charging current to be received over the VBUS connector at the PMIC to charge the battery; and, responsively receiving, at the PMIC, the DC charging power over the VBUS connector from the charger according to the target charging conditions and convey the DC charging power to the battery for charging the battery, wherein regulating of the DC charging power occurs only by the regulator of the charger, according to the target charging conditions, and not in the circuitry of the device.

12. The non-transitory computer-readable medium of claim 11, the method further comprising: determining, at the processor, the target charging current to be received over the VBUS connector for charging the battery; and adjust the power control signal so that the target current is received at the VBUS connector.

13. The non-transitory computer-readable medium of claim 11, the method further comprising: determining, at the processor, the target charging voltage to be received over the VBUS connector for charging the battery, and adjust the power control signal so that the target voltage is received at the VBUS connector.

14. A system comprising:

a charger comprising: a respective USB (Universal Serial Bus) port comprising a respective USB Identification (USBID) connector and a respective Voltage Bus (VBUS) connector; a respective regulator configured to convert power from an AC (alternating current) power supply to a DC (direct current) charging power; and a controller configured to receive a power control signal over the respective USBID connector; and, responsively control the regulator to transmit the DC charging power over the respective VBUS connector according to target charging conditions received in the power control signal; and, a device comprising: a USB port configured to communicate with the respective USB port of the charger, the USB port comprising a USBID connector configured to mate with the respective USB connector of the charger and a VBUS connector configured to mate with the respective VBUS connector of the charger, the charger being separate from the device; a battery; and, circuitry comprising: a power management integrated circuit (PMIC) in-line between the USB port and the battery, the PMIC connected to the VBUS connector and the battery, a processor in communication with the USBID connector, and a wired link between the PMIC and the processor, the wired link for conveying existing charging conditions to the processor, the existing charging conditions comprising one or more of a charging current passing through the PMIC to the battery and a voltage drop across the PMIC, the circuitry lacking a regulator between the PMIC and the battery, and the processor configured to:

when the existing charging conditions are different from target charging conditions, transmit the power control signal from the USBID connector to the respective USBID connector of the charger to the controller of the charger, the target charging conditions in the power control signal for controlling the respective regulator at the charger to output DC charging power from the respective VBUS connector of the charger to the VBUS connector according to the target charging conditions, the target charging conditions indicative of one or more of a target charging voltage and a target charging current to be received from the respective VBUS connector of the charger to the VBUS connector charge the battery; the PMIC configured to responsively receive the DC charging power from the respective VBUS connector of the charger via the VBUS connector and convey the DC charging power to the battery according to the target charging conditions, wherein regulating of the DC charging power occurs only by the regulator of the charger, according to the target charging conditions, and not in the circuitry of the device.

* * * * *